Figure 1:
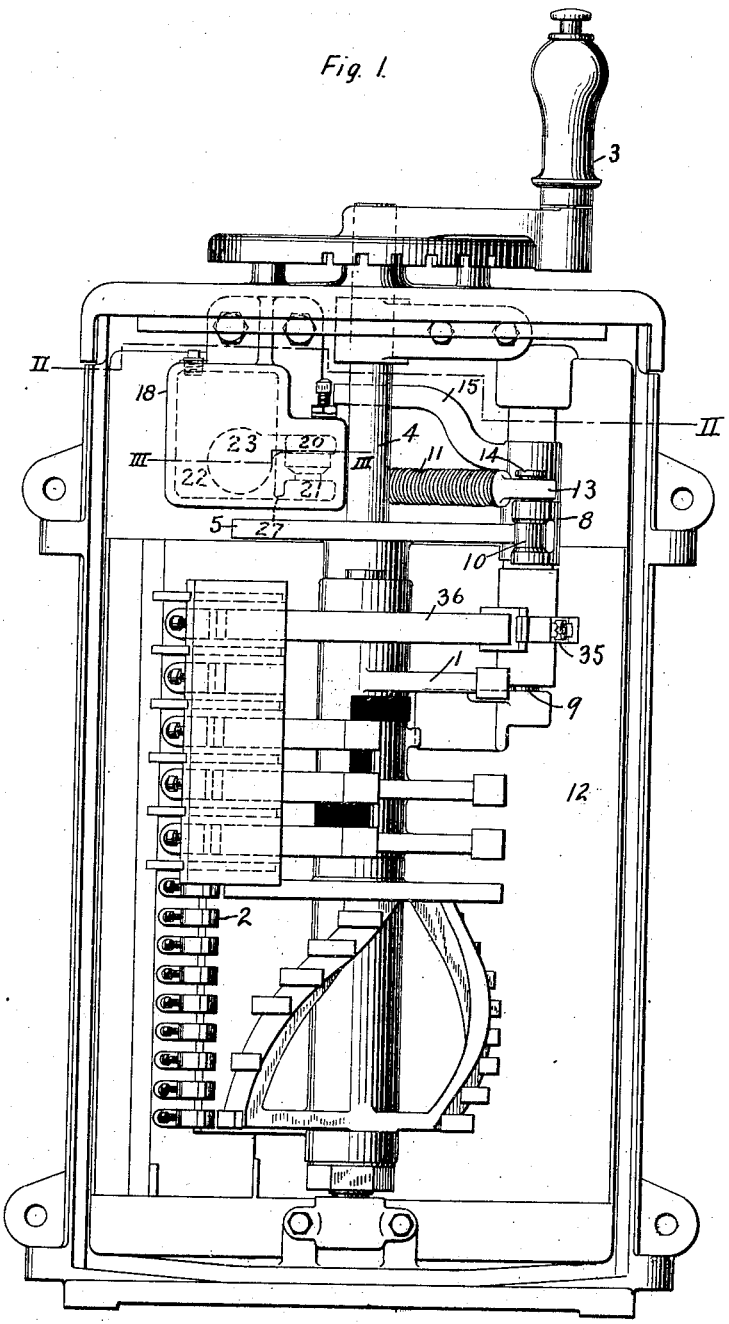

T. S. PERKINS.
CONTROLLER FOR ELECTRIC MOTORS.
APPLICATION FILED MAR. 7, 1904.

914,972.

Patented Mar. 9, 1909.
3 SHEETS—SHEET 1.

WITNESSES:
C. L. Belcher
Fred. H. Miller

INVENTOR.
Thomas S. Perkins
BY
ATTORNEY.

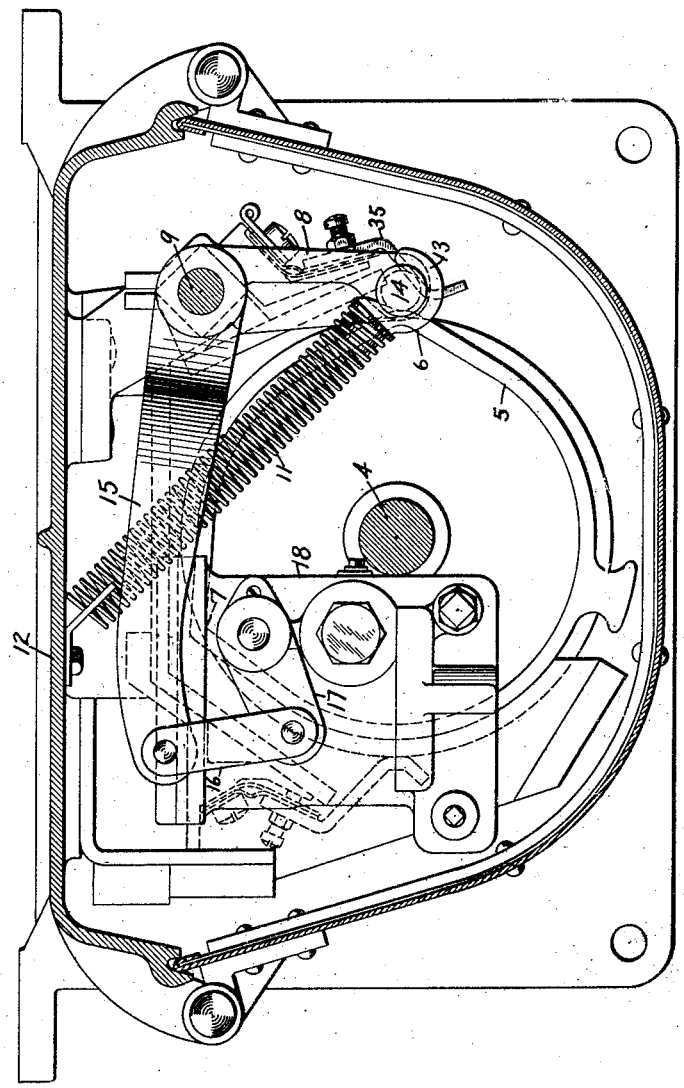

T. S. PERKINS.
CONTROLLER FOR ELECTRIC MOTORS.
APPLICATION FILED MAR. 7, 1904.
914,972.
Patented Mar. 9, 1909.
3 SHEETS—SHEET 3.
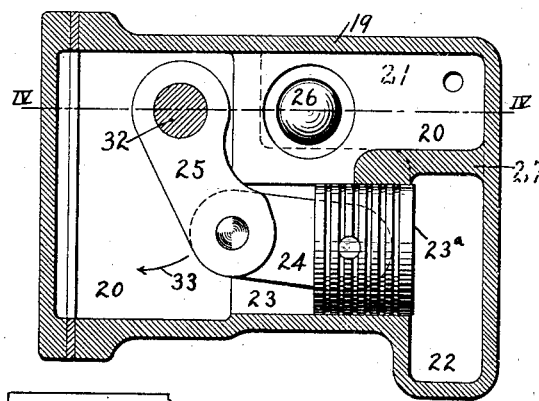
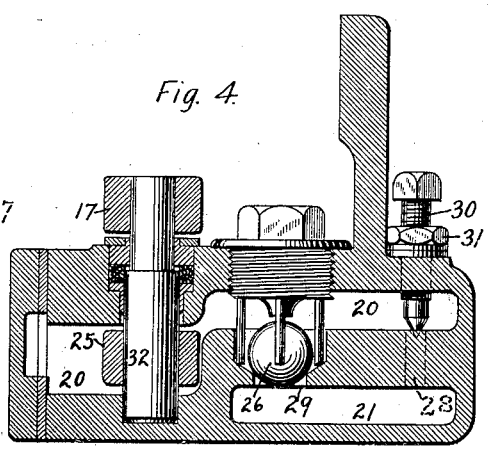
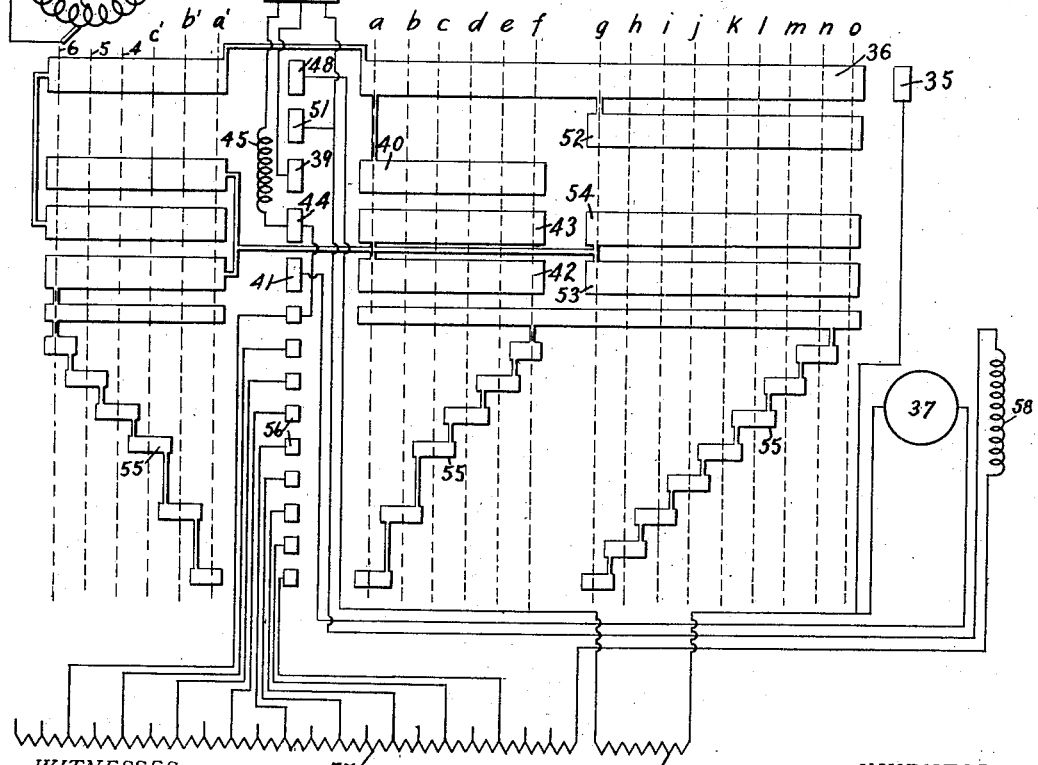
WITNESSES:
C. L. Belcher
Fred. H. Miller
INVENTOR.
Thomas S. Perkins
BY
ATTORNEY.

UNITED STATES PATENT OFFICE.

THOMAS S. PERKINS, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROLLER FOR ELECTRIC MOTORS.

No. 914,972.     Specification of Letters Patent.     Patented March 9, 1909.

Application filed March 7, 1904. Serial No. 196,949.

*To all whom it may concern:*

Be it known that I, THOMAS S. PERKINS, a citizen of the United States, and a resident of Wilkinsburg, in the county of Allegheny and State of Pennsylvania, have invented a new and useful Improvement in Controllers for Electric Motors, of which the following is a specification.

My invention relates to controllers for electric motors, and it has for its object to provide means for preventing injurious sparking and flashing at the brushes of electric motors when starting and when operating temporarily as generators.

In the operation of shunt and compound wound, variable speed motors, in which the speed variation is obtained by the successive application of two or more voltages and by varying the current in the shunt winding of the field magnet, or by either of these expedients alone, it has been found that, when changing the motor connections from a higher to a lower voltage, or when suddenly strengthening the motor field, serious sparking occurs at the commutator brushes by reason of the fact that the motor temporarily acts as a generator and delivers current to the supply circuit.

My invention provides simple mechanical means for inserting a resistance into the motor armature circuit during a predetermined period of time when the motor is started and when its connections are changed from a higher to a lower voltage supply circuit, or when, from any other cause, the motor acts temporarily as a generator.

In the accompanying drawings, Figure 1 is a view, in front elevation, of a controller which embodies my invention, the cover being removed. Fig. 2 is a sectional view on line II—II of Fig. 1. Fig. 3 is a sectional view on line III—III of Fig. 1. Fig. 4 is a sectional view on line IV—IV of Fig. 3, and Fig. 5 is a diagrammatic view of the development of the controller drum and contact fingers and the connections thereof with the various circuits.

The controller comprises all of the parts ordinarily embodied in a controller for delivering multi-voltages to electric motors and for varying the resistances of the field magnet circuits thereof, such as rotatable drum contacts 1 and stationary contact fingers 2, the drum being operated by means of a handle 3. Mounted upon the same shaft 4 as the rotatable drum contacts, is a cam wheel 5 of approximately circular form but having projections 6 and 7 corresponding, respectively, to the "off" position of the controller and to the transitional period between its higher and lower voltage positions. An arm 8 is secured, at one end, to a short shaft 9 and, at its free end, is provided with a roller 10 which is adapted to engage the periphery of the cam wheel 5. The roller 10 is held in engagement with the periphery of the cam wheel 5 by means of a coil-spring 11, one end of which is secured to the controller frame 12 and the other end of which is provided with a hook 13 that engages a stud 14 on the free end of the arm 8.

A lever 15 is rigidly attached, at one end, to the rotatable shaft 9 and, at its free end, is pivoted to one end of a link 16, which, in turn, is pivoted to a crank lever 17 of a dashpot 18. The dashpot 18 is provided for the purpose of retarding the movement of the free end of the arm 8 and its roller 10 toward the cam wheel 5 after they have been moved outward by either of the projections 6 and 7. While any suitable retarding means may be employed for this purpose, I have found it convenient to use the dashpot shown in the drawings, which comprises a case 19 having three chambers 20, 21 and 22, a cylinder 23, a piston 23ª, a link 24, a crank lever 25 and a suitable valve 26. The chambers 21 and 22 are connected only by a restricted passage 27 and chambers 20 and 21 are connected by means of passages 28 and 29, the effective cross-section of the former of which may be adjusted from the outside of the dashpot by means of a set-screw 30 and a lock-nut 31, while the latter is opened and closed by means of the ball-valve 26. Communication between the chambers 20 and 22 is controlled by the piston 23ª. The dashpot chambers are filled with any suitable liquid, such as glycerin or a mixture of glycerin and water.

If the crank lever 25, which is operated by means of a shaft 32 that connects the outside of the dashpot with the corresponding crank lever 17, is moved in the direction of the arrow 33, (Fig. 3), its movement is retarded, because the ball-valve 26 is forced to its seat by the pressure of the liquid, and the only opening between the chambers 20 and 21 is through the restricted passage 28, and the degree of this retardation depends upon the area of this passageway, which may be adjusted, as before stated, by means of the set-screw 30. However, if the crank lever 25 moves in the opposite direction, the pressure of the liquid in the chamber 21 raises the ball-valve 26 and the piston 23 is allowed to return to the position shown in Fig. 3 without retardation.

Secured to the rotatable shaft 9, is a contact finger 35 which engages with the drum ring 36 except when the portion 6 or the portion 7 of the cam wheel 5 engages the roller 10.

Referring now to Fig. 5, it is seen that, when the finger 35 engages the drum ring 36, the circuit through the armature 37 of the motor is, for positions from $a$ to $f$ of the controller drum, from the supply conductor 38, through fingers 39, drum contacts 40 and 36, contact finger 35, motor armature 37, contact finger 41, drum contacts 42 and 43, contact finger 44, blow-out coil 45, to the line conductor 46, the line conductors being supplied from any suitable source 47 of multi-voltages, such as that described in Patent No. 513,006, granted to Michael von Dolivo-Dobrowolsky January 16, 1894. If, however, the contact finger 35 does not engage the drum ring 36, the circuit is from the line conductor 38, through the contact finger 39, drum contacts 40 and 36, contact finger 48, resistance 49, armature 37, contact finger 41, drum contacts 42 and 43, contact finger 44, blow-out coil 45, to the line conductor 46. As before stated, the contact finger 35 is raised out of engagement with the drum ring 36 in passing from the "off" to the $a$ or $a'$ position of the controller drum and also in passing from the $f$ to the $g$ position and is held out of engagement therewith during a period of time the length of which is determined by the adjustment of the dashpot.

If, when the controller occupies the position $g$, or one of the succeeding positions, and the motor operates at a speed corresponding to such position, the controller is returned to the position $f$, or one of the preceding positions, the voltage generated by the motor may be in excess of that of the conductors to which the armature is connected. All injury to the motor or other parts, however, is prevented because the resistance 49 is inserted in the armature circuit when the controller is moved from the position $g$ to the position $f$. It will be understood that the circuits of the motor, when operating temporarily as a generator, are the same as for motor operation upon the lower voltage circuit. Similar conditions prevail when the controller is moved from position $a$ to position $a'$, and vice versa.

In the $g$ position of the controller drum, if the contact finger 35 engages the drum ring 36, the circuit through the motor armature 37 is from the line conductor 50, through the contact finger 51, drum contacts 52 and 36, contact finger 35, motor armature 37, contact finger 41, drum contacts 53 and 54, contact finger 44, blow-out coil 45, to the line conductor 46; but if the finger 35 does not engage the drum ring 36, the preventive resistance 49 is inserted in the motor armature circuit, since that circuit is from the line conductor 50, through the contact finger 51, drum contacts 52 and 36, contact finger 48, resistance 49, motor armature 37, contact finger 41, drum contacts 53 and 54, contact finger 44 and blow-out coil 45, to the line conductor 46.

The spirally disposed sets of drum contacts 55 and the coöperating contact fingers 56 are employed for the purpose of varying the amount of the resistance 57 that is included in circuit with the field magnet winding 58, and since they constitute no part of my present invention, except in the sense and to the extent that they are parts of a complete controller having the improvements already set forth and hereinafter claimed, I have deemed it unnecessary to present a detailed description thereof.

While I have shown and described my invention as utilized only when changing from the "off" to running positions of the controller, or when changing the voltage supplied to the motor armature, it is to be understood that it may be employed equally well, if desired, in connection with single voltage systems and may be caused to operate between any two desired positions of the controller. It may also be employed in the operation of two or more electric motors which are arranged to be connected in series and parallel, when changing from the parallel to the series connection thereof.

I claim as my invention:

1. The combination with an electric motor having a shunt field magnet winding, of a resistance, means for connecting the same in series with the motor-armature whenever the motor operates temporarily as a generator, means for short-circuiting the resistance and retarding mechanism for the short-circuiting means.

2. A retarding device comprising a member having two chambers and communicating passages between the chambers, a piston adapted to operate in said member and to open and close one of the communicating passages, a valve adapted to govern communication between the chambers at another of said passages, and means for adjusting the effective area of the remaining passages.

3. A retarding device comprising a member having two chambers and communicating passages between the chambers, a piston adapted to operate in said member and to open and close one of the communicating passages, a ball valve seated over another of the passages, and means whereby the effective area of the remaining passage may be adjusted exterior to the member.

In testimony whereof, I have hereunto subscribed my name this 5th day of March, 1904.

THOMAS S. PERKINS.

Witnesses:
 H. L. VAN VALKENBURG,
 BIRNEY HINES.